United States Patent [19]

Scherf

[11] Patent Number: 5,390,301
[45] Date of Patent: Feb. 14, 1995

[54] METHOD AND APPARATUS FOR COMMUNICATING DEVICE-SPECIFIC INFORMATION BETWEEN A DEVICE DRIVER AND AN OPERATING SYSTEM IN A COMPUTER SYSTEM

[75] Inventor: Steve D. Scherf, Sunnyvale, Calif.

[73] Assignee: Acer Incorporated, Taipei,

[21] Appl. No.: 929,884

[22] Filed: Aug. 11, 1992

[51] Int. Cl.[6] .............................................. G06F 3/00
[52] U.S. Cl. .................................... 395/325; 395/700;
  364/DIG. 1; 364/239; 364/239.9; 364/280;
  364/280.2; 364/280.9; 364/284
[58] Field of Search .............. 364/975.4, 968, DIG. 1;
  395/700, 325

[56] References Cited

U.S. PATENT DOCUMENTS

| | | | |
|---|---|---|---|
| 4,589,063 | 5/1986 | Shah et al. | 364/200 |
| 4,649,479 | 3/1987 | Advani et al. | 364/300 |
| 5,046,025 | 9/1991 | Harper et al. | 395/518 |
| 5,113,354 | 5/1992 | Harper et al. | 364/514 |
| 5,122,949 | 6/1992 | Harper et al. | 395/109 |
| 5,179,666 | 1/1993 | Rimmer et al. | 395/275 |

Primary Examiner—Kevin A. Kriess
Assistant Examiner—J. Hall Backenstose
Attorney, Agent, or Firm—Townsend and Townsend Khourie and Crew

[57] ABSTRACT

A method of communication between a device driver and a system kernel uses a standardized generic data structure which facilitates communication of numeric limitations as well as flags. In addition, device-specific extensions may be added to the data structure to permit communication of new types of information concerning devices without sacrificing standardization. Device drivers store device capability information in the data structures during system startup, and the system kernel reads the information prior to performing an I/O request.

27 Claims, 8 Drawing Sheets

METHOD AND APPARATUS FOR COMMUNICATING DEVICE-SPECIFIC INFORMATION BETWEEN A DEVICE DRIVER AND AN OPERATING SYSTEM IN A COMPUTER SYSTEM

BACKGROUND OF THE INVENTION

1. Field of the Invention

This invention relates to communication protocols in a computer system, and more particularly, to a method of communication between a device driver and a kernel in a computer system.

2. Description of the Related Art

Most operating systems, and particularly the UNIX operating system, are capable of supporting several different system architectures, and can interface with many different types of input/output (I/O) cards and peripherals. Generally, each such device is connected to the system via a hardware controller, and also has a software program called a "device driver". The core of the operating system software, or the "kernel", uses these device drivers to program the hardware controllers to facilitate input and output with the devices. In most systems, several devices may share the same controller and/or device driver.

In UNIX implementations, each driver is uniquely identified by a "major" number, and each device controlled by that driver is uniquely identified by a "minor" number. In this way, the kernel can feed an I/O request to the appropriate driver by checking the major number associated with the request, and the driver can in turn feed the request to the appropriate device by checking the minor number. The major and minor numbers together refer to a particular device on a particular controller programmed by a particular device driver.

Conventionally, when the user adds a device and its associated controller, he or she links the object code of the device driver into the kernel, enabling the kernel to program the new controller (via the device driver) to communicate with the device.

In the past, the drivers have not provided the kernel with information regarding the capabilities and limitations of the attached devices. This has led to several detrimental effects including: 1) the kernel may ask a controller or device to perform a task which it is not capable of performing, resulting in data loss or a failed I/O request; 2) the kernel may not formulate an I/O task in the most optimal way for the controller or device, resulting in reduced I/O throughput; and/or 3) the kernel may not take advantage of special features of the controller or device, resulting in lower overall functionality.

Currently, device manufacturers use widely varying interface protocols, making it difficult for the kernel to obtain the information it needs. Furthermore, most conventional communication schemes provide only limited information to the kernel, preventing the kernel from using the device efficiently. Previous attempts at standardizing the interface protocols have been inadequate because they are not robust enough to supply full information about the devices, and do not have the capability of adding more information. Consequently, devices using these systems have had to go outside the standardized protocol in order to provide additional information to the kernel, thus obviating the benefits of the interface protocol.

Some examples of the limitations of such prior art schemes are:

1) In some systems, information about a device can only be obtained by the kernel using the major number of the device as a key. Consequently, when one driver is associated with several devices, the kernel is unable to obtain information specific to the individual devices, thus requiring the driver to report the least common denominator of all its devices. As a result, if some of the devices have a particular I/O capability while others do not, and one driver covers both types of devices, the kernel will not be able to take advantage of the particular I/O capability.

2) Some systems, such as that used by the Santa Cruz Operation, limit the amount of information that can be communicated to the kernel. The Santa Cruz Operation communicates only one aspect of disk controllers, namely a one-bit flag indicating whether the "scatter/gather" feature is supported by the device. Other parameters, such as how much data may be transferred with or without "scatter/gather", or whether the device has any memory access limitations, are not communicated to the kernel. In fact, since such parameters can only be communicated through integers, rather than single-bit flags, it is not possible to communicate them with the conventional scheme of operation. Rather, the kernel guesses at some of these limits and ignores others—a practice that may and sometimes does result in reduced performance, data corruption, or even system failure if the kernel's assumptions are incorrect.

3) Some systems improve on that of the Santa Cruz Operation, but are still fundamentally limited in that they use flags where numerical information is needed, and they provide no mechanism for adding more parameters than was initially contemplated.

Without a standard interface scheme which allows for communication of all relevant information between device drivers and the system kernel, including provisions for adding more information than was initially contemplated in the interface's design, the kernel must either be reprogrammed to deal with new communication protocols whenever peripherals are connected to the system, or it must make dangerous assumptions about the capabilities of the devices.

SUMMARY OF THE INVENTION

In accordance with the present invention, there is provided a standardized method of communication between a device driver and a system kernel which addresses all of the problems discussed above with respect to the prior art. In the present invention, the driver characterizes the device abilities in a uniform manner and the kernel can access the relevant information efficiently. The method facilitates the communication of numeric limitations as well as flags. It keys information by both major and minor numbers, thus allowing access to individual device information even when several devices share a driver. Finally, by providing an extendible data structure, the method allows for addition of new types of information without the sacrifices required by standardization.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF THE PREFERRED EMBODIMENT

The Figures depict a preferred embodiment of the present invention for purposes of illustration only. One skilled in the art will readily recognize from the following discussion that alternative embodiments of the structures and methods illustrated herein may be employed without departing from the principles of the invention described herein. In particular, this discussion describes the invention with reference to the UNIX operating system, as that is the preferred embodiment of the invention. However, the principles of the invention could easily be applied to other operating systems, as will be clear to one skilled in the art.

The method of the present invention comprises two main parts: storage of data structures by device drivers, and retrieval of the data structures by the system kernel. The storage phase typically occurs during system startup, at which time all of the device drivers store relevant information about their devices in data structures. The retrieval phase typically occurs prior to an I/O request involving a particular device.

The data structure is preferably a well-defined table containing several fields. Each field holds an integer or flag value which describes a characteristic of the I/O controller or device. Since devices are often very different, no single data structure exists that can efficiently describe all possible types. To address this problem, the following scheme is employed. A generic structure is defined; it contains fields pertaining to common features of all devices. One of its fields contains either a null value or a pointer to a memory address containing a device-specific extension of the generic structure. A null value indicates that no extension is needed or provided. This scheme allows communication of additional data without necessitating alteration of the original data structure, thus maintaining backward compatibility with older drivers.

Figure 1:
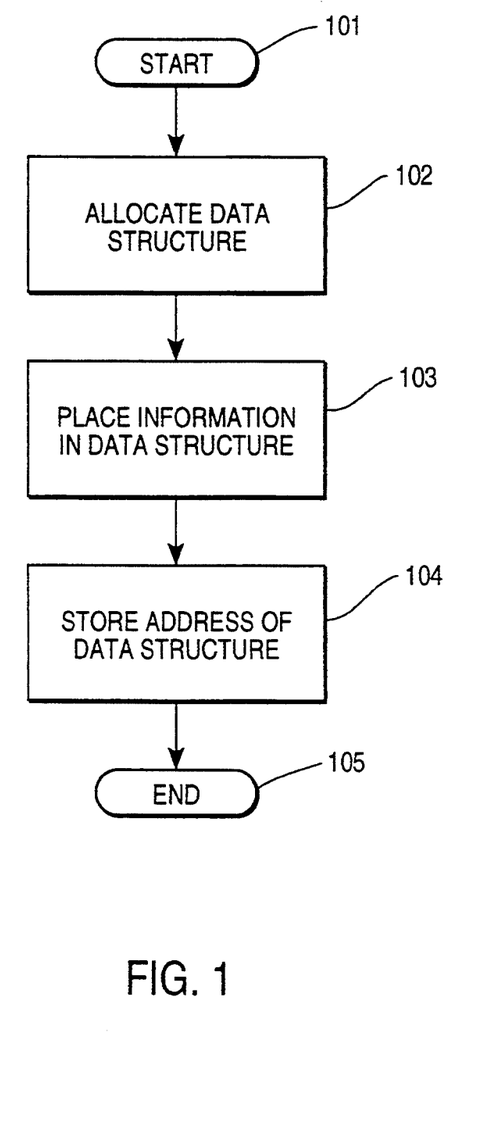
FIG. 1 is a flowchart showing the method of the present invention in the data storage phase.

Referring now to FIG. 1, there is shown a flowchart of the data storage phase of the present invention. This phase typically occurs during system startup, or initialization. In step 101, the data storage phase starts. In step 102, each driver in the system allocates one data structure for each peripheral it controls. In step 103, the drivers fill the data structures with information reflecting the features and limitations of the attached devices. Once the data structures have been filled, the address of each structure is stored in a table in step 104. This table cross-references the data structure address with the major/minor number pair, and the type of device (either a "block" device or a "character" device), so that the information in the data structure may be accessed and retrieved by the kernel when needed. In step 105, the data storage phase ends.

Figure 2:
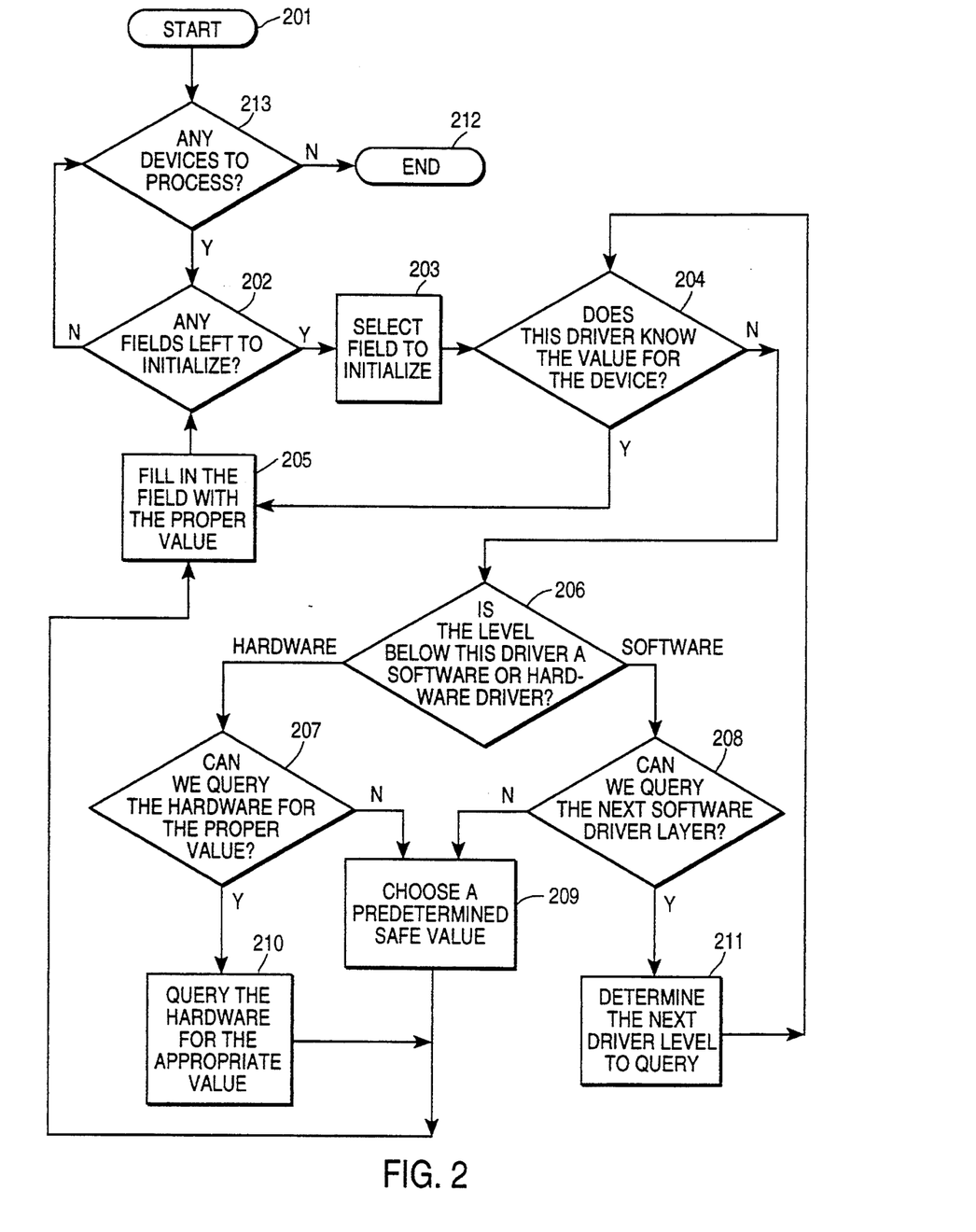
FIG. 2 is a flowchart showing a method of placing information into a data structure according to the present invention.

Referring now to FIG. 2, there is shown a flowchart illustrating the preferred method of obtaining information and placing it in the data structure (step 103 of FIG. 1), according to the present invention. Each driver performs these steps for each device during system startup. Essentially, for each field, the driver checks if it has the information, and if it does not, it queries successively lower-level drivers (both software and hardware) until it either gets the information or is unable to query any further. For the purpose of this invention, the hardware and hardware driver are considered to be one unit. If the driver does not get the information, it chooses a predetermined safe value. The driver then fills in the field with the value, and continues on to the next field.

The flowchart of FIG. 2 shows the method in more detail. In step 201, the data structure filling operation starts. In step 213, the method of the present invention tests whether there are any devices left to process. If there are not, the method is complete and the filling operation ends in step 212. However, if there are more devices to process, the method proceeds to step 202. In step 202, the driver checks to see if there are any fields to be initialized, or filled with information. If not, the method proceeds to step 213 to process the next device. If there are any fields remaining to be initialized, the driver proceeds with step 203, where it selects one of the fields to initialize.

Once a field has been selected, the driver checks in step 204 to see if it knows the device's value for the selected field. For example, if the field is to specify the data transfer rate, the driver checks to see if it knows the rate for the device. If it does, it places the information in the field in step 205. If the driver does not have the information to fill in the fields, it can query lower-level drivers for the information. In step 206, it checks to see if the level below this driver is another software driver or a hardware driver. Under the UNIX operating system, there may be several levels of software drivers above the hardware driver. The present invention advantageously parses each level until the software or hardware driver with the device information is reached. If it is a software driver, processing continues with step 208, where the upper-level driver determines whether it can query the lower-level driver for the information. If it can, it determines in step 211 what is the next driver level to query. Once this is done, processing returns to step 204 to see if the driver now knows the value. If, in step 208, the lower level software layer cannot be queried, the upper-level driver chooses a predetermined safe value in step 209, and proceeds to step 205 where it fills in the field with the value.

If, in step 206, it is found that the level below the current driver is a hardware driver, processing continues with step 207, where the driver determines whether it can query the hardware for the proper value. If it can, it does so in step 210 and continues with step 205. If it cannot, it chooses a predetermined safe value in step 209 and proceeds to step 205.

Once the field has been filled in step 205, the driver returns to step 202 to see if there are any more fields to initialize. The method of the present invention is to loop through all the fields to initialize them. Similarly, an outer loop is used to process all the devices.

Figure 3:
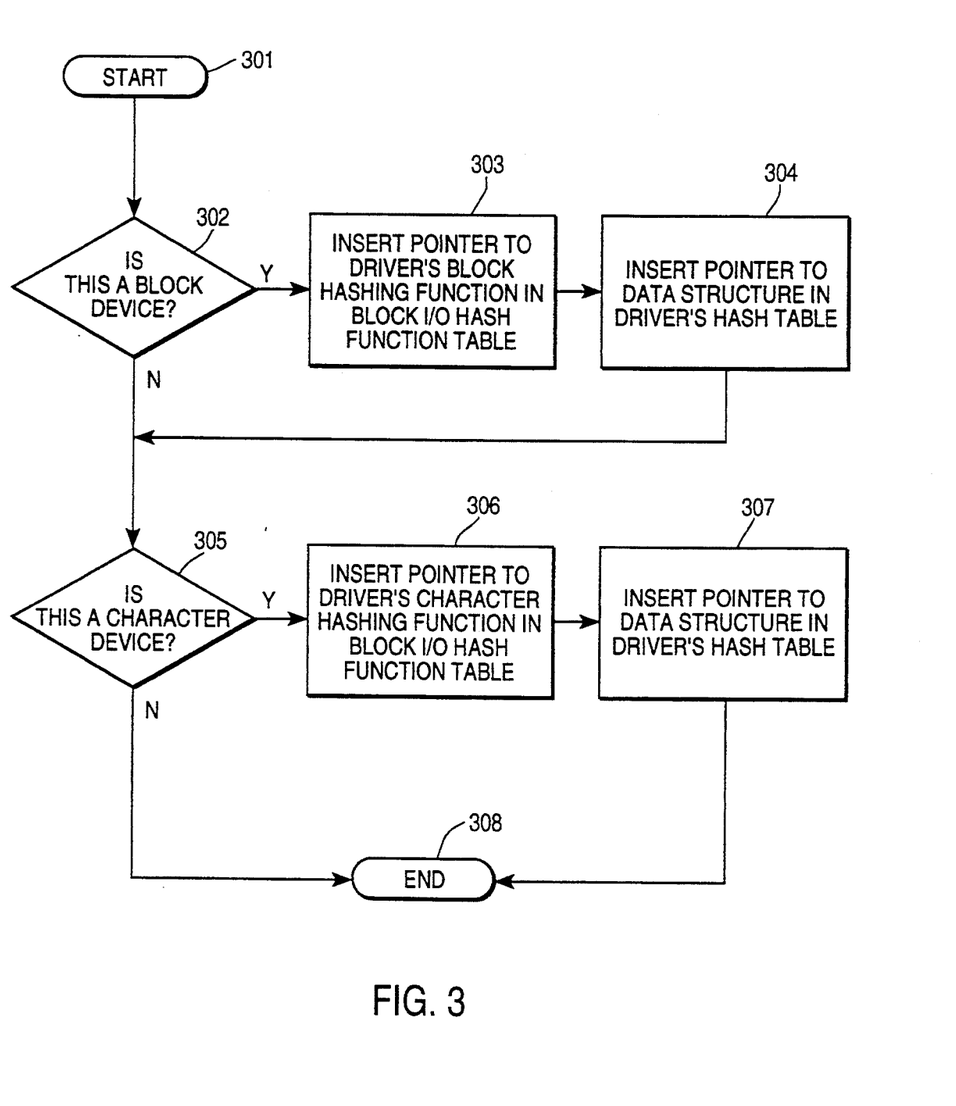
FIG. 3 is a flowchart showing a method of storing an address of a data structure according to the present invention.

Referring now to FIG. 3, there is shown a flowchart of the preferred method for storing the address of the data structure once it has been filled with information (step 104 of FIG. 1), according to the present invention. In step 301, the process starts. In step 302, the method determines whether the device is a block device. If not, processing continues with step 305. If the device is a block device, the method continues to step 303, in which it inserts a pointer to the driver's block hashing function in a block I/O hash function table, indexed by the device's major number. Then, in step 304, the driver inserts a pointer to the data structure in the driver's hashing table using the driver's store function. The present method uses the driver's hash functions and the store function provided by the drivers. This is done so that the kernel will be able to activate the driver's hashing function when required, and the hashing function will access the table to find the data structure.

In step 305, the driver determines whether the device is a character device. If not, the driver proceeds to step 308 where the storing function ends. If the device is a character device, the driver continues on to step 306, in which it inserts a pointer to the driver's character hashing function in a character I/O hash function table, indexed by the device's major number. This character I/O hash function table is separate from the block function table. Then, in step 307, the driver inserts a pointer to the data structure in the driver's hash table. Finally, in step 308, the storing function ends.

Figure 4:
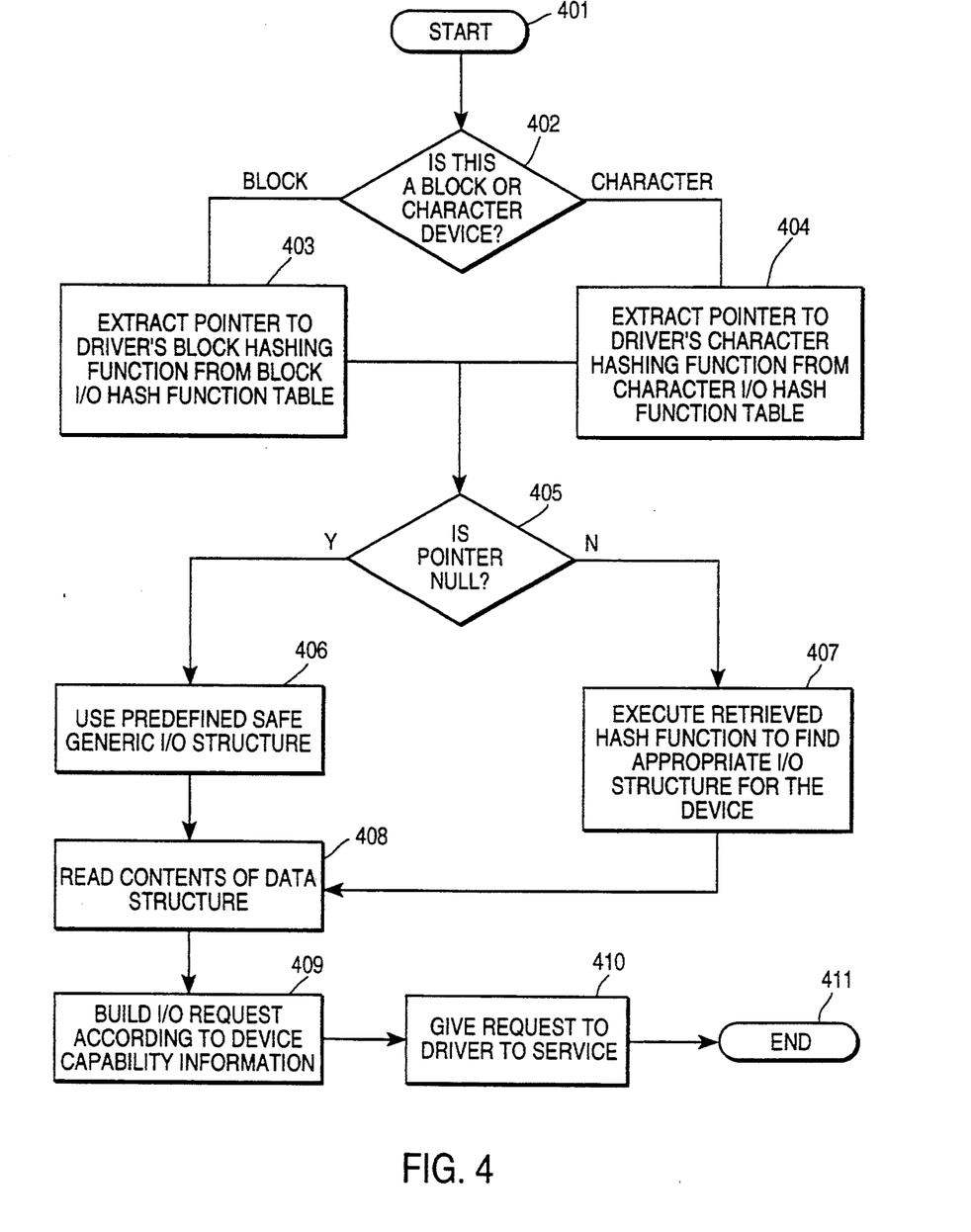
FIG. 4 is a flowchart showing a method of retrieving data from a data structure according to the present invention.

Referring now to FIG. 4, there is shown a flowchart of the preferred method for retrieving the information from the data structure prior to a data request, according to the present invention. As discussed above, these steps are normally performed by a kernel prior to an I/O request for a particular device.

In step 401, the process begins. In step 402, the kernel checks to see whether the device is a block or a character device. If it is a block device, the method continues in step 403, and the kernel looks in the block I/O hash function table to find the pointer to the driver's block hashing function. If it is a character device, in step 404, the kernel looks in the character I/O hash function table, to find the pointer to the driver's character hashing function.

Regardless of whether the device is block or character, the method proceeds to step 405, where it checks whether the pointer it just retrieved from the hashing function has a null value. If so, in step 406, the kernel uses a predefined safe generic I/O structure. If the pointer is not null, in step 407, the kernel executes the hash function at the memory location specified by the pointer. This hash function, when executed, retrieves the I/O structure for the device. In step 408, the kernel reads the data structure to obtain the needed information regarding the device's capability. In step 409, the kernel builds its I/O request according to the device capability information. In step 410, the I/O request is given to the driver for processing as is conventional, and the process ends in step 411.

Figure 5A:
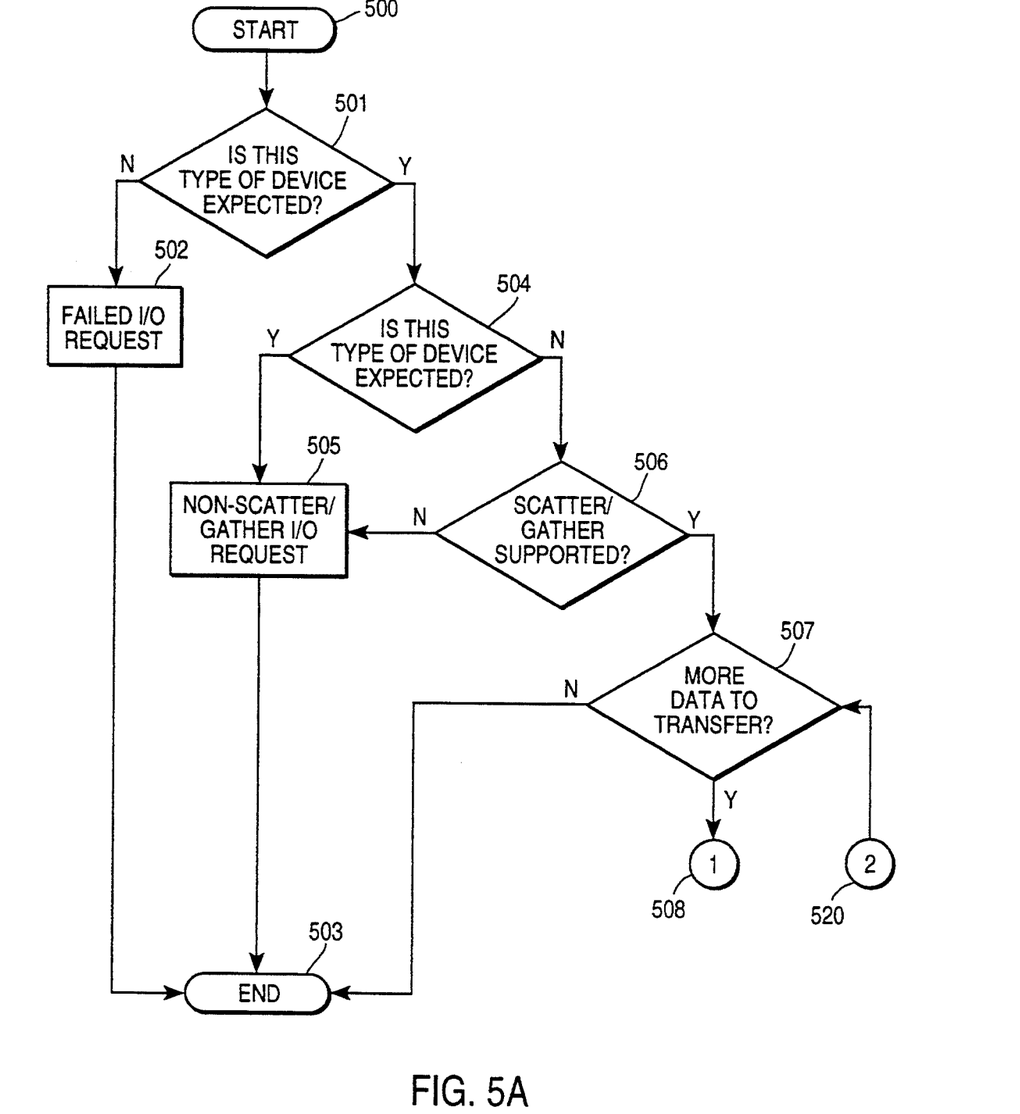
FIGS. 5A and 5B are flowcharts showing a method for building an I/O request according to the present invention.
Figure 5B:
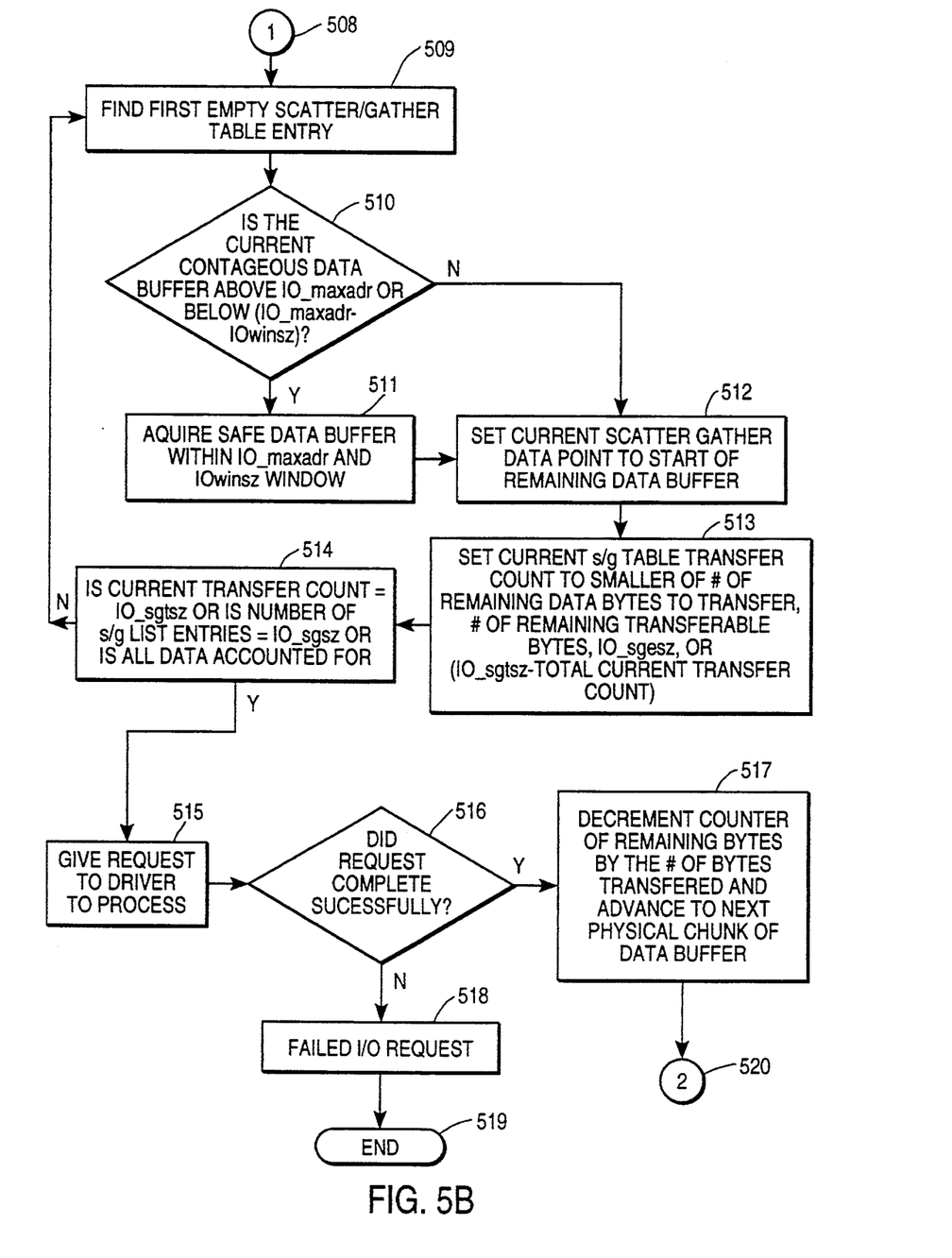

Referring now to FIGS. 5A and 5B, the method for building an I/O request of step 409 is shown by the flowchart. The process begins in step 500. In step 501, the preferred method first tests whether the device type for this I/O operation is expected. If it is not an expected device type, there is a failed I/O request in step 502 and the process ends in step 503. However, if the device type is an expected one, the method proceeds to step 504. In step 504, the method tests whether the data space is physically contiguous. If the space is physically contiguous a non-scatter/gather (s/g) I/O request is created and processed in step 505 and the method ends in step 503. In such cases, the data may be transferred in as large a block size as the hardware will allow since all the data resides in a contiguous space. If the space is not contiguous, the process continues to step 506, where the kernel tests whether the driver supports scatter/gather (s/g). Scatter/gather is a conventional method used in UNIX to store data over address spaces that are not adjacent in memory. If s/g is not supported, the process proceeds to step 505 and then ends in step 503.

Once step 507 has been reached, the system has determined that s/g is supported. The method of the present invention uses the s/g method to formulate the I/O request and transfer the data. In step 507, the preferred method tests whether all the data has been transferred. The method will repeat the following steps until all the data has been transferred. If it is determined that there is no more data, then the process ends in step 503. If there is more data to transfer, then the method continues in step 509 of FIG. 5B. In step 509, the method finds the first empty s/g table entry. Next, in step 510, the kernel tests if the first address of the current contiguous data buffer is above the highest address accessible by the current device (IO_maxadr) or below the window of memory which the device can access (IO_maxadr IO_winsz). If the data is not in the accessible memory address space (i.e., above the maximum IO address), then the method acquires a safe data buffer within the IO_maxadr and the accessible window size in step 511. This assures that data is transferred safely. After a safe data buffer is acquired, the method proceeds to step 512. If the data buffer is accessible, the method proceeds directly to step 512. In step 512, the method sets the current s/g data pointer to the start of the remaining data buffer. Next, in step 513, the current s/g table transfer count is set to the smaller of 1) the number of remaining bytes to transfer, 2) the number of remaining transferable bytes, 3) the maximum number of bytes in a single s/g entry (IOsgesz), or 4) the maximum number of bytes transferable by the device in a s/g request (IO_sgtsz) minus the total current transfer count. This value is also subtracted from the total current transfer count which identifies the number of bytes that are being transferred with this I/O request. This allows the present invention to build as big a list as possible, while avoiding building a list that is too large. Next, in step 514, the method determines whether the 1) the current transfer count equals the maximum number of bytes transferable by a s/g request(IO_sgtsz), or whether 2) the number of s/g list entries equals the maximum number of entries in a s/g request(IO_sgsz), or whether 3) all the data is accounted for. If there is more data, the method returns to step 509 to process the next entry in the s/g table. However, if all the data is accounted for, the method continues to step 515 and the I/O request is given to the driver to process. In step 516, the method tests whether the request was completed successfully. If the request was not successfully completed, a failed I/O request is returned in step 518 and the I/O request ends in step 519 (same as 503). However, if the request was completed, the method advances to step 517 where the counter of remaining bytes to transfer is decremented and the method proceeds to the next physical chunk of data buffer. After step 517, the process returns to step 507.

Figure 6:
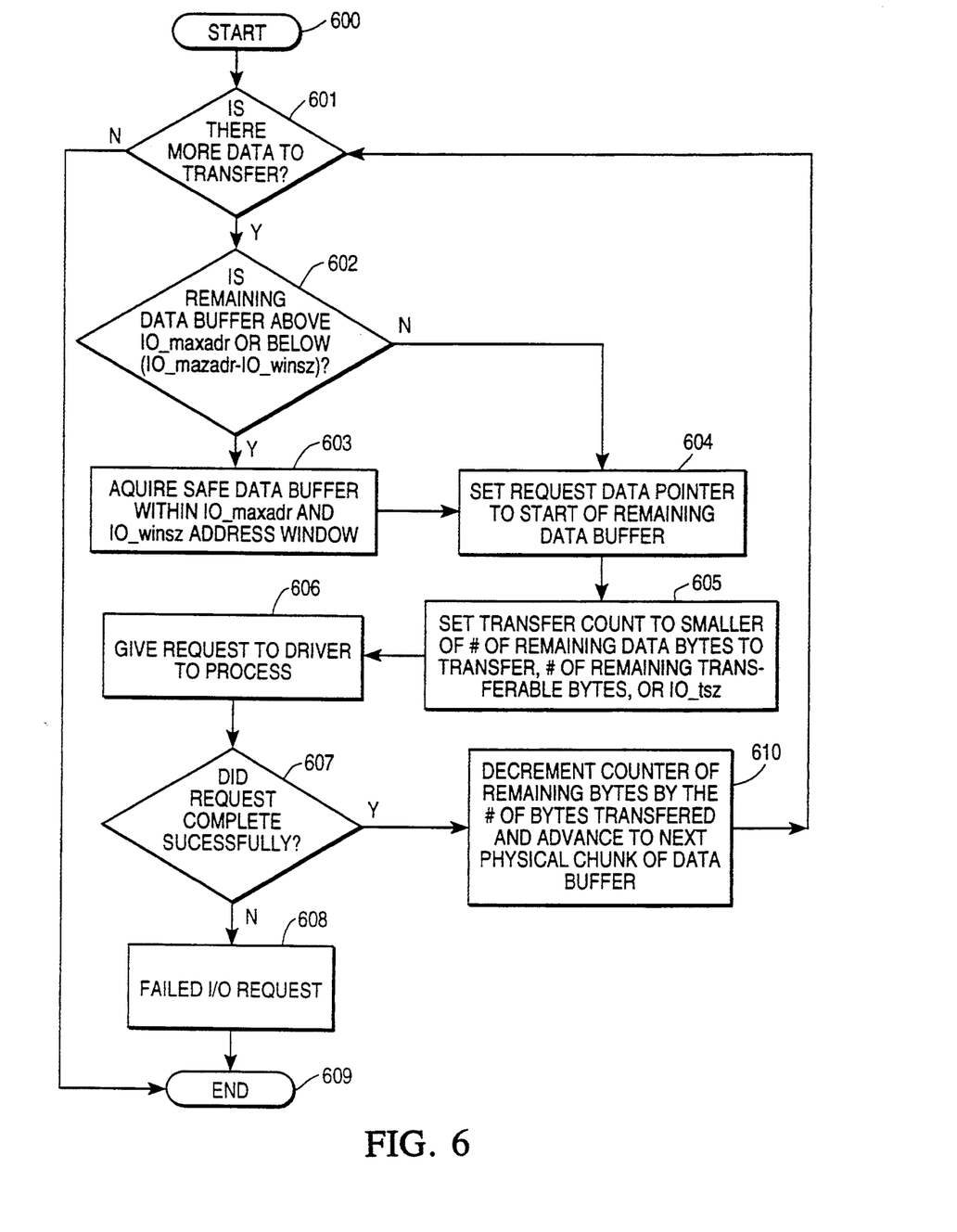
FIG. 6 is a flowchart showing a method for processing non-scatter gather I/O requests.

Referring now to FIG. 6, a preferred embodiment for processing non-s/g I/O requests of step 505 of FIG. 5A is shown. The method for processing a non-s/g I/O request is very similar to the process outlined in FIG. 5A without the overhead required for s/g. As shown in FIG. 6, the preferred method starts in step 600. In step 601, the method tests whether there is more data to transfer. If there is not, the request is complete and the method ends in step 609. However, if there is more data to transfer, the process continues in step 602. In step 602, the kernel tests if the first address of the remaining data buffer is above the highest address accessible with the current device (IO_maxadr) or below the window of memory which the device can access (IO_maxadr-IO_winsz). If the data is not in the accessible memory address space, then the method acquires a safe data buffer within the IO_maxadr and the accessible window size, in step 603. This assures that data is transferred safely. After a safe data buffer is acquired, the method proceeds to step 604. If the data buffer is accessible, the method proceeds directly to step 604. In step 604, the method sets the transfer count to the smaller of 1) the number of remaining bytes to transfer, 2) the number of remaining transferable bytes, or 3) the maximum number of bytes transferrable by the device in a single request (IO_tsz). Next, in step 606, the I/O request is given to the driver to process. In step 607, the method tests whether the request was completed successfully. If the request was not successfully completed, a failed I/O request is returned in step 608 and the I/O request ends in step 609. However, if the request was completed, the method advances to step 610 where the counter of remaining bytes to transfer is decremented and the method proceeds to the next physical chunk of data buffer. After step 610, the process returns to step 601 to transfer any remaining data.

Figure 7:
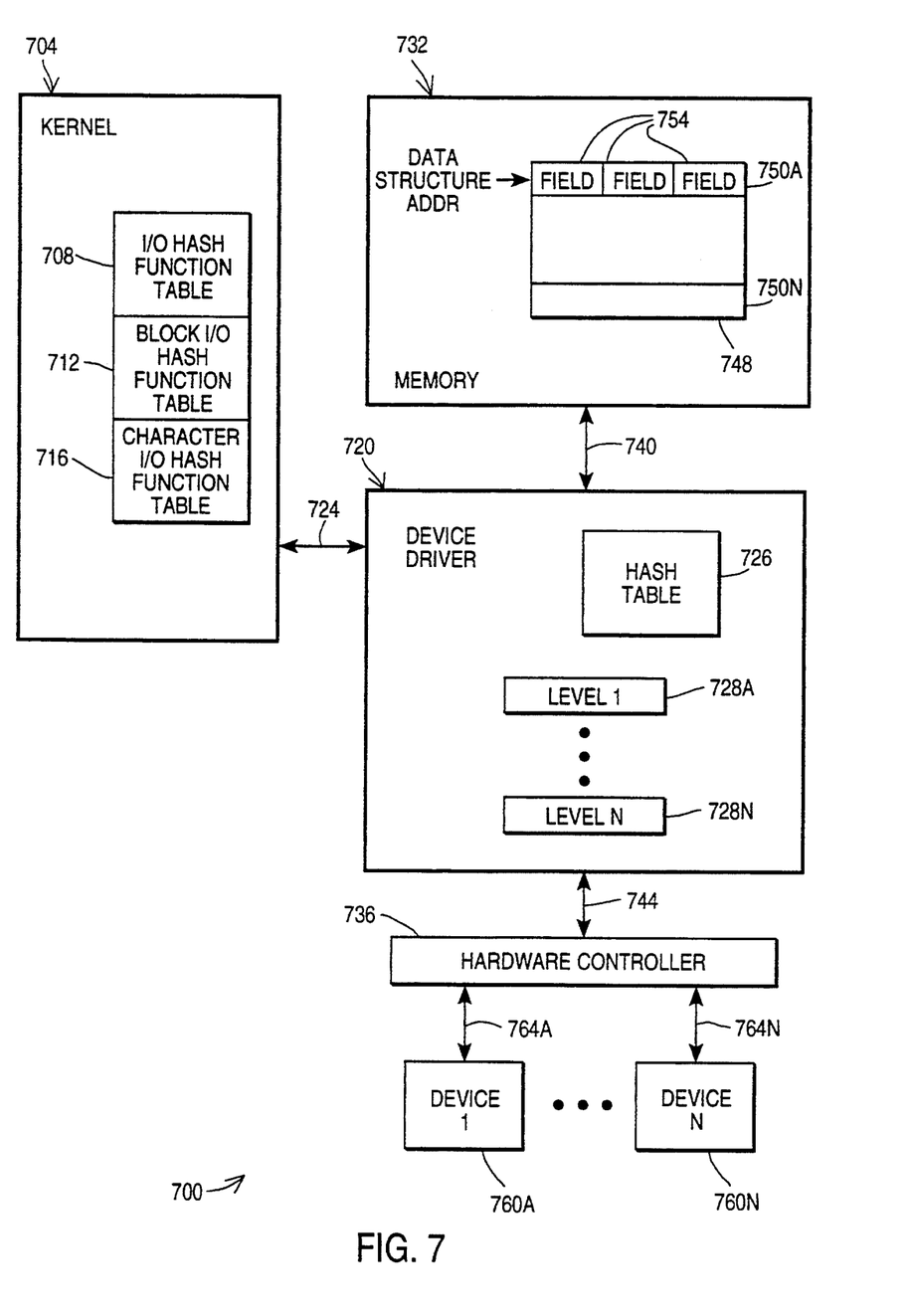
FIG. 7 is a block diagram of a particular embodiment of an apparatus according to the present invention for communicating device-specific information between a device driver and an operating system.

FIG. 7 is a block diagram of a particular embodiment of an apparatus 700 for communicating device-specific information according to the present invention. FIG. 7 shows a kernel 704 having an I/O hash function table 708 comprising a block I/O hash function table 712 and a character I/O hash function table 716. Kernel 704 communicates with device driver 720 through a communication path 724. Device driver 720 includes a hash table 726 and software driver programs 728A-N. Device driver 720 communicates with a memory 732 and a hardware controller 736 through communication paths 740 and 744, respectively. Memory 732 includes a data structure 748 located at the data structure address. Data structure 748 has a plurality of entries 750A-750N. Each entry comprises a plurality of fields 754. Hardware controller 736 communicates with hardware devices 760A-N through corresponding communication paths 764A-N. Hardware controller 736 includes the hardware level program used for controlling the operation of devices 760A-N.

From the above description, it will be apparent that the invention disclosed herein provides a novel and advantageous method for communication between a device driver and kernel in a computer system. The foregoing discussion discloses and describes merely exemplary methods and embodiments of the present invention. As will be understood by those familiar with the art, the invention may be embodied in other specific forms without departing from the spirit or essential characteristics thereof. For example, different indexing schemes could be employed for the hash function tables. Alternatively, the invention could be practiced without device-specific extensions. Accordingly, the disclosure of the present invention is intended to be illustrative, but not limiting, of the scope of the invention, which is set forth in the following claims.

What is claimed is:

1. A method of communicating device capability information of a hardware device, each hardware device having a major number, in a computer system from a device driver which directly controls the device to a kernel of an operating system, said device driver interacting with said hardware device through a plurality of software and hardware device drivers, comprising the steps of:
    obtaining, by the device driver, the device capability information for each device the device driver controls by at least one of the following:
        a) obtaining the device capability information from itself, if it has the information, or if not,
        b) querying successively lower-level software and hardware device drivers until the device capability information is obtained or until it cannot query any lower, and if the device capability information is not yet obtained,
        c) choosing a predetermined safe value;
    storing, by the device driver, the device capability information and at least a first pointer indexed by the device's major number in a data structure memory of the computer system; and
    prior to the operating system performing an input or output operation using the device, obtaining, by the kernel of the operating system, the device capability information from the data structure memory by accessing the data structure memory using said pointer indexed by the device's major number.

2. The method of claim 1, wherein the step of storing the device capability information is performed during startup of the computer system.

3. The method of claim 1, wherein said computer system includes a generic data structure memory having a plurality of predefined fields, and wherein the step of storing the device capability information comprises the steps of:
    storing, by said device driver, a plurality of items of information in said plurality of predefined fields of said generic data structure; and
    responsive to the need for additional device-specific information, storing, by said device driver, the additional device-specific information in an extended device-specific structure having an address in the generic data structure, and storing a pointer to the address in the generic data structure.

4. The method of claim 1, wherein the step of storing the device capability information comprises the steps of:
    allocating, by said device driver, a data structure having a plurality of fields and having an address in memory;
    placing, by said device driver, the device capability information in the data structure; and
    storing, by the device driver, the address of the data structure in said data structure memory.

5. The method of claim 4, wherein the step of obtaining the device capability information is performed prior to an input or output operation using the device.

6. The method according to claim 1 further comprising the steps of:
   building, by the kernel, an I/O request according to the device capability information obtained by the kernel; and
   passing the I/O request from the kernel to the device driver so that the device driver may perform the requested I/O operation.

7. The method according to claim 1 wherein the operating system is a UNIX operating system.

8. A method of communicating device capability information of a hardware device in a computer system from a device driver which controls the device to a kernel of an operating system, said device driver interacting with said hardware device through a plurality of software and hardware device drivers, comprising the steps of:
   storing, by the device driver, the device capability information in a plurality of fields of a data structure memory in the computing system, the data structure having an address;
   storing, by the device driver the address of the data structure in a table;
   prior to performing an input or output operation using the device, obtaining, by the kernel, the device capability information from the memory data structure;
   wherein the step of storing the device capability information in the data structure comprises the steps of, for each field of the data structure:
     querying, by the device driver, successively lower level software and hardware device drivers for information relevant to the field; and
     responsive to the information having been supplied, placing, by the device driver, the information in the field, otherwise placing a predefined safe value in the field.

9. The method of claim 8, wherein the device driver has a plurality of levels, and wherein one of the levels comprises a hardware level program and the remaining levels comprise software level programs.

10. The method of claim 9, further comprising the following steps, performed after querying the device driver for information and responsive to the queried device driver failing to supply the information:
    determining, by the computer system, whether the level of device driver immediately below the last-queried level is a software level or a hardware level;
    responsive to the determining step indicating a software level, determining, by the computer system, whether the software level may be queried;
    responsive to the software level being able to be queried, querying, by the computer system, the software level for information relevant to the field; and
    responsive to the software level being able to be queried and failing to supply the information, repeating, by the computer system, the preceding three steps for successively lower levels of the device driver.

11. The method of claim 10, further comprising the following steps, performed responsive to the determining step indicating a hardware level:
    determining, by the computer system, whether the hardware level may be queried; and
    responsive to the hardware level being able to be queried, querying, by the computer system, the hardware level for information relevant to the field.

12. A method of communicating device capability information of a hardware device in a computer system from a device driver which controls the device to a kernel of an operating system, comprising the steps of:
    storing, by the device driver, the device capability information in a plurality of fields of a data structure memory in the computing system, the data structure having an address;
    storing, by the device driver, the address of the data structure in a hash table;
    prior to performing an input or output operation using the device, obtaining, by the kernel, the device capability information from the memory data structure;
    wherein the device driver has a hashing function, wherein the kernel has a hash function table, and wherein the step of storing the address of the data structure comprises the steps of:
    inserting a pointer to the hashing function in the hash function table; and
    inserting a pointer to the data structure in the hash table.

13. The method of claim 12 wherein the hardware device has a major number and a minor number, wherein the step of inserting a pointer to the hashing function includes the step of indexing the I/O hash function table by the major number, and wherein the step of inserting a pointer to the data structure includes the step of indexing the hash table by the major number and the minor number.

14. A method of communicating device capability information of a hardware device in a computer system from a device driver which controls the device to a kernel of an operating system, comprising the steps of:
    storing, by the device driver, the device capability information in a plurality of fields of a data structure memory in the computing system, the data structure having an address;
    storing, by the device driver, the address of the data structure in a hash table;
    prior to performing an input or output operation using the device, obtaining, by the kernel, the device capability information from the memory data structure;
    wherein the device driver has a block hashing function if the device is a block device and a character hashing function if the device is a character device, wherein the kernel has a block I/O hash function table and a character I/O hash function table, and wherein the step of storing the address of the data structure comprises the steps of:
    responsive to the device being a block device, inserting a pointer to the block hashing function in the block I/O hash function table;
    responsive to the device being a character device, inserting a pointer to the character hashing function in the character I/O hash function table; and
    inserting a pointer to the data structure in the hash table.

15. The method of claim 14 wherein the hardware device has a major number and a minor number, wherein the step of inserting a pointer to the block hashing function includes the step of indexing the block I/O hash function table by the major number, wherein the step of inserting a pointer to the character hashing function includes the step of indexing the character I/O hash function table by the major number, and wherein the step of inserting a pointer to the data structure includes the step of indexing the hash table by the major number and the minor number.

16. A method of communicating device capability information of a hardware device in a computer system from a device driver which controls the device to a kernel of an operating system, including processing the device capability information, comprising the steps of:

storing, by the device driver, the device capability information in a plurality of fields of a data structure memory in the computing system, the data structure having an address;

storing, by the device driver, the address of the data structure in a hash table;

prior to performing an input or output operation using the device, obtaining, by the kernel, the device capability information from the memory data structure;

wherein the device driver has a hashing function, wherein the kernel has a hash function table, and wherein the step of obtaining the device capability information comprises the steps of:

extracting a pointer to the hashing function from the hash function table;

responsive to the pointer having a null value, using a predefined safe generic data structure, otherwise executing the hashing function to obtain the data structure; and reading the contents of the data structure to obtain the device capability information.

17. The method of claim 16, further comprising the step of building, by the kernel, an I/O request according to the device capability information.

18. The method of claim 16 wherein the hardware device has a major number and a minor number, wherein the step of extracting a pointer to the hashing function includes the step of indexing the I/O hash function table by the major number, and wherein the step of executing the hashing function includes the step of indexing the hash table by the major number and the minor number.

19. The method of claim 18, further comprising the step of building, by the kernel, an I/O request according to the device capability information.

20. A method of communicating device capability information of a hardware device in a computer system from a device driver which controls the device to a kernel of an operating system, comprising the steps of:

storing, by the device driver, the device capability information in a plurality of fields of a data structure memory in the computing system, the data structure having an address;

storing, by the device driver, the address of the data structure in a hash table;

prior to performing an input or output operation using the device, obtaining, by the kernel, the device capability information from the memory data structure;

wherein the device driver has a block hashing function if the device is a block device and a character hashing function if the device is a character device, wherein the kernel has a block I/O hash function table and a character I/O hash function table, and wherein the step of obtaining the device capability information comprises the steps of:

responsive to the device being a block device, extracting a pointer to the block hashing function from the block I/O hash function table, otherwise extracting a pointer to the character hashing function from the character I/O hash function table;

responsive to the extracted pointer having a null value, using a predefined safe generic data structure, otherwise executing the hashing function to obtain the data structure; and reading the contents of the data structure to obtain the device capability information.

21. The method of claim 20, further comprising the step of building, by the kernel, an I/O request according to the device capability information.

22. The method of claim 20 wherein the hardware device has a major number and a minor number, wherein the step of extracting a pointer to the block hashing function includes the step of indexing the block I/O hash function table by the major number, wherein the step of extracting a pointer to the character hashing function includes the step of indexing the character I/O hash function table by the major number and wherein the step of executing the hashing function includes the step of indexing the hash table by the major number and the minor number.

23. The method of claim 22, further comprising the step of building, by the kernel, an I/O request according to the device capability information.

24. A method of communicating device capability information of a hardware device in a computer system from a device driver which controls the device to a kernel of an operating system, including processing the device capability information, wherein:

the device has a major number, a minor number, and the device driver has a plurality of levels;

one of the levels comprises a hardware level program and the remaining levels comprise software level programs;

the device driver has a hash table indexed by the major number and the minor number, a block hashing function if the device is a block device, and a character hashing function if the device is a character device; and the kernel has a block I/O hash function table indexed by the major number and a character I/O hash function table indexed by the major number;

the method comprising the steps of:

during startup of the computer system:

allocating, by the computer system, a data structure memory having a plurality of fields and having an address;

storing, by the device driver, the device capability information in the data structure; and storing, by the device driver, the address of the data structure in a table; and prior to an input or output operation using the device:

obtaining, by the kernel, the device capability information from the data structure; and building, by the kernel, an I/O request according to the device capability information.

25. The method of claim 24, wherein the step of storing the device capability information in the data structure comprises the steps of, for each field in the data structure:

querying an upper level of the device driver for information relevant to the field;

responsive to the device driver level failing to supply the information:
- determining whether the level of device driver immediately below the last-queried level is a software level or a hardware level;
- responsive to the determining step indicating a software level, determining whether the software level may be queried;
- responsive to the software level being able to be queried, querying the software level for information relevant to the field;
- responsive to the software level being able to be queried and failing to supply the information, repeating the preceding three steps for successively lower levels; and
- responsive to the determining step indicating a hardware level:
  - determining whether the hardware level may be queried; and
  - responsive to the hardware level being able to be queried, querying the hardware level for information relevant to the field; and
- responsive to information having been supplied, storing the information in the field, otherwise storing a predefined safe valve in the field.

26. The method of claim 25, wherein the step of storing the address of the data structure comprises the steps of:
- responsive to the device being a block device, inserting a pointer to the
  - block hashing function in the block I/O hash function table; responsive to the device being a character device, inserting a pointer to
  - the character hashing function in the character I/O hash function table; and
- inserting a pointer to the data structure in the hash table.

27. The method of claim 26, wherein the step of obtaining the device capability information comprises the steps of:
- responsive to the device being a block device, extracting a pointer to the hashing function from the block I/O hash function table, otherwise extracting a pointer to the hashing function from the character I/O hash function table;
- responsive to the extracted pointer having a null value, using a predefined safe generic data structure, otherwise executing the hashing function to obtain the data structure; and
- reading the contents of the data structure to obtain the device capability information.

* * * * *